United States Patent [19]
Müller et al.

[11] Patent Number: 5,025,677
[45] Date of Patent: Jun. 25, 1991

[54] GEAR SHIFT MECHANISM FOR A MOTOR VEHICLE TRANSMISSION

[75] Inventors: Robert Müller, Monsheim; Bernd Wacker, Weissach, both of Fed. Rep. of Germany

[73] Assignee: Dr. Ing. h.c.F. Porsche AG, Fed. Rep. of Germany

[21] Appl. No.: 357,814

[22] Filed: May 30, 1989

[30] Foreign Application Priority Data

May 27, 1988 [DE] Fed. Rep. of Germany ....... 3817990

[51] Int. Cl.⁵ ............................................. G05G 9/16
[52] U.S. Cl. .................................. 74/473 R; 180/336; 184/5; 384/13; 384/42
[58] Field of Search ..................... 74/473 R, 475, 476, 74/477; 180/336; 184/5; 384/13, 42

[56] References Cited

U.S. PATENT DOCUMENTS

| | | | |
|---|---|---|---|
| 3,718,209 | 2/1973 | Moslo | 384/13 X |
| 3,985,404 | 10/1976 | Plaza et al. | 384/13 |
| 4,086,822 | 5/1978 | Kuroda | 74/473 R |
| 4,311,064 | 1/1982 | Sukeshita | 74/473 R |
| 4,817,968 | 4/1989 | Fischle | 277/212 FB X |

FOREIGN PATENT DOCUMENTS 2533642 4/1976 Fed. Rep. of Germany.
2217943 9/1974 France.

Primary Examiner—Allan D. Herrmann
Attorney, Agent, or Firm—Evenson, Wands, Edwards, Lenahan & McKeown

[57] ABSTRACT

A manually operable gear shift lever is disposed in a narrowly limited space with radial play on a stationary guide tube. The lower end of the gear shift lever is disposed in a pivotable ball joint. A gear shift rod leads from the gear shift lever to the transmission. The gear shift lever is disposed on the guide tube in an easily movable, durably lubricated and vibration-damping manner.

11 Claims, 3 Drawing Sheets

GEAR SHIFT MECHANISM FOR A MOTOR VEHICLE TRANSMISSION

BACKGROUND AND SUMMARY OF THE INVENTION

The present invention generally relates to a gear shift mechanism, and more particularly to a gear shift mechanism adapted for use in a narrowly limited space so that all gears can be shifted by slight shifting movement.

German Published, Unexamined Patent Application discloses (DE-OS) 25 33 642 discloses a gear shift mechanism in which a gear shift lever, at its lower end, pivotally to all sides, is fixed in a ball joint. Above this bearing, a gear shift rod leading to the transmission is pivotally connected to the gear shift lever in such a manner that the latter, within the preselection gap of the transmission, can be moved transversely to the driving direction and, for shifting into the gears, can be moved in driving direction.

An object of the present invention is to provide a gear shift mechanism having a gear shift lever arranged in a narrowly limited space, for example, a narrow transaxle tube, in such a manner that all gears of a transmission can be shifted by slightly shifting the gear shift lever utilizing a gear shift rod fastened at the gear shift lever.

Further object of the invention is to provide a gear shift mechanism in which vibrations are to be damped which affect the gear shift lever on the transmission side.

Advantages achieved by preferred embodiments of the present invention include the ability to arrange a gear shift lever in a narrowly limited space so that all gears can be shifted by slight shifting movements. In addition, the gear shift lever of the gear shift mechanism is disposed to be easily shiftable, durably lubricated and disconnected from vibrations.

Other objects, advantages and novel features of the present invention will become apparent from the following detailed description of the invention when considered in conjunction with the accompanying drawings.

DETAILED DESCRIPTION OF THE DRAWING

Figure 1:
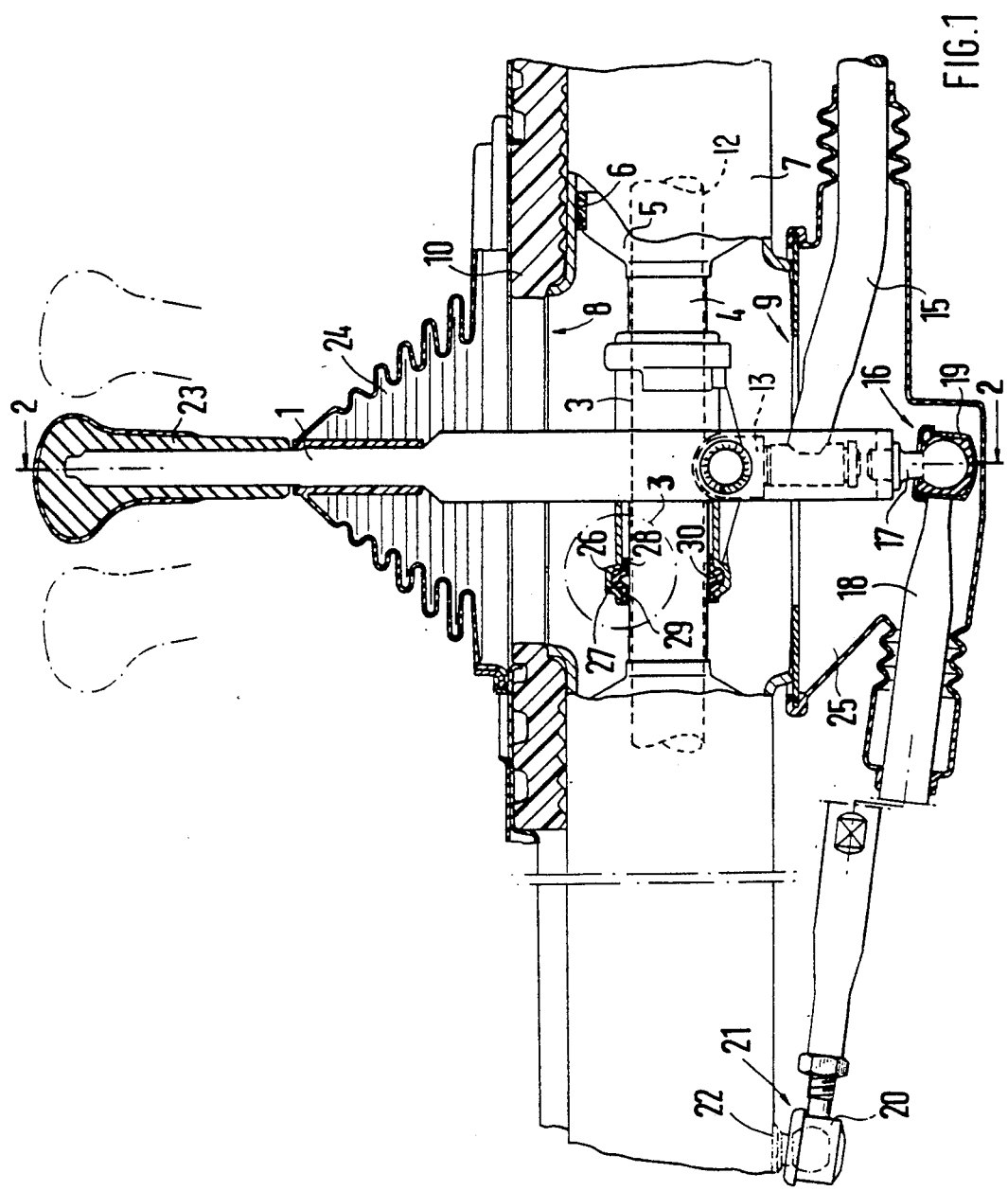
FIG. 1 is a view, partially in section, illustrating one embodiment of the gear shift mechanism.

An embodiment of the invention will be explained in detail by means of the following drawings.

A gear shift lever 1, by means of a bearing pin 2, is rotatably disposed in a guide bush 3. The guide bush 3 is twistably and slidably disposed on a stationary guide tube 4 with a radial play S1, as best seen in FIG. 3. The guide tube 4, by means of sleeves 5 and seals 6 fitted onto the sleeves 5, is pressed into a transaxle tube 7. In the area of the gear shift lever 1, the transaxle tube 7 is provided with a respective circular opening 8, 9 on the top and on the bottom. In addition, the transaxle tube 7, is disposed in a tunnel 11 with damping elements 10 as best seen in FIG. 2.

Figure 2:
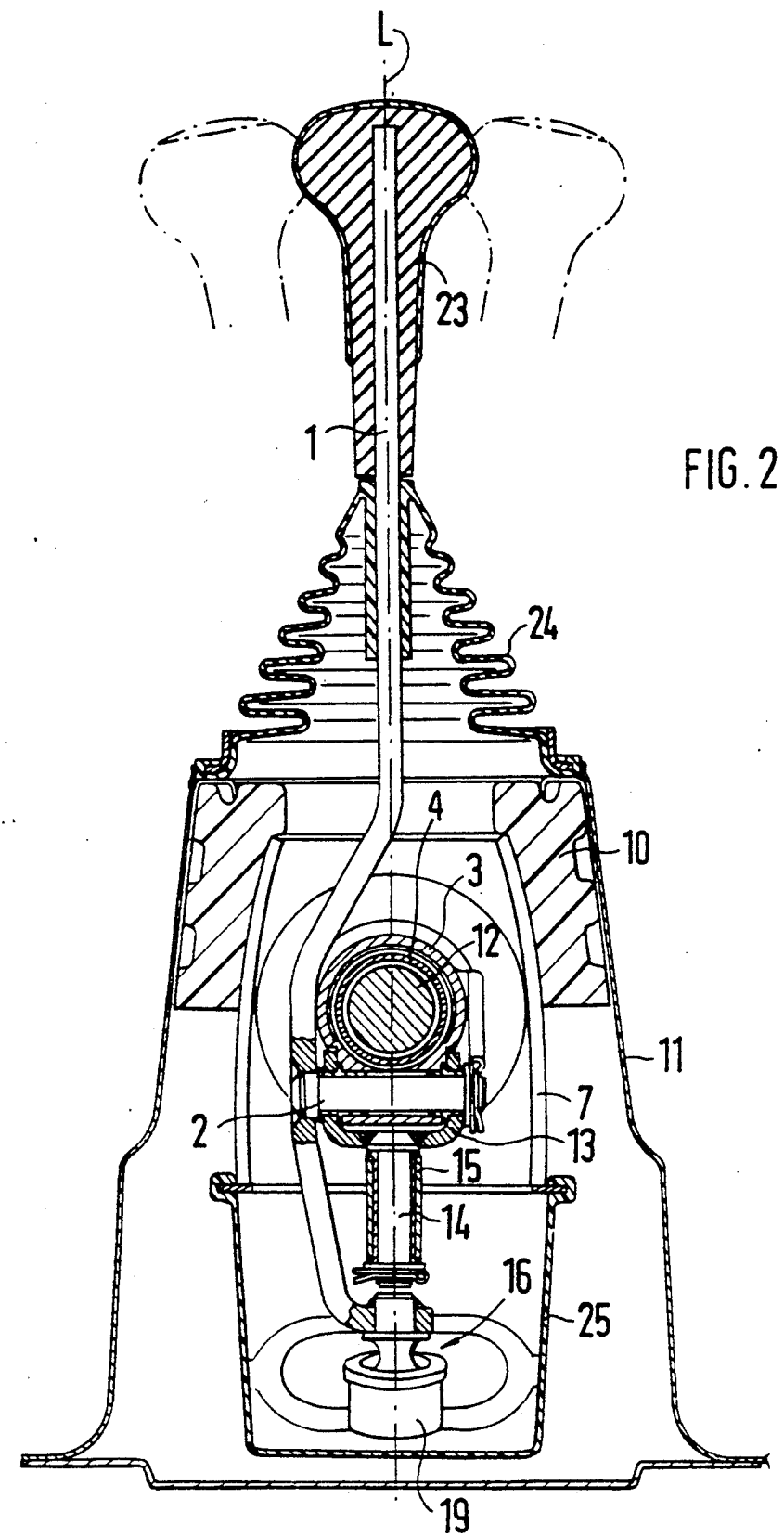
FIG. 2 a sectional view taken along Line II—II of FIG. 1.
Figure 3:
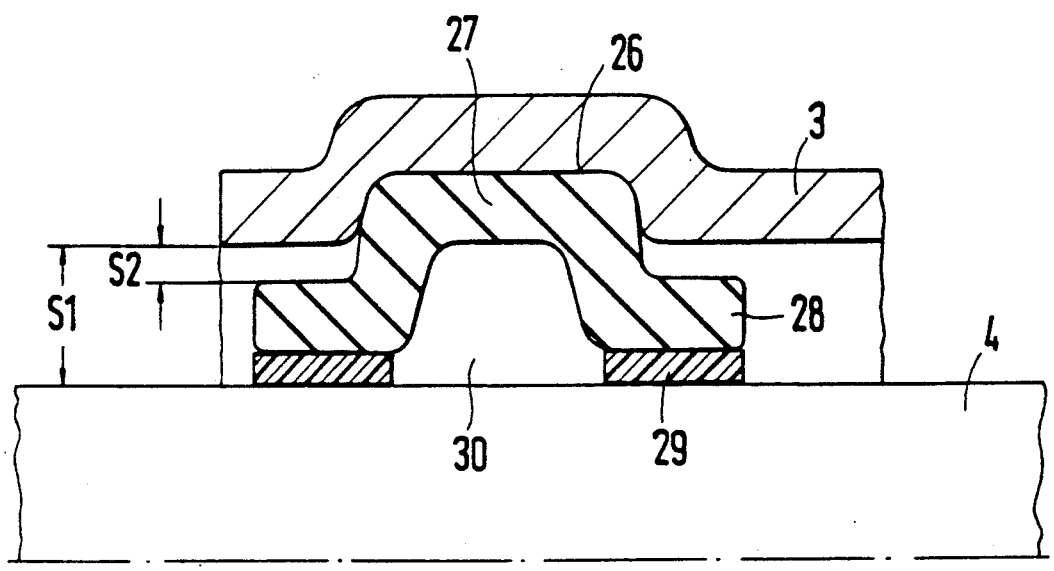
FIG. 3 is an enlarged detail III of FIG. 1.

A drive shaft 12 extends centrally in the guide bush 3 as seen in FIG. 2 and connects a transmission, which is not shown in the drawing, with an axle drive, which is also not shown in the drawing. At both free ends of the bearing pin 2 penetrating the guide bush 3, a U-shaped clip 13 is suspended which can be rotated around the bearing pin 2 and at which a pin 14 is fastened which points vertically downward. On the pin 14, a gear shift rod 15 is rotatably disposed which leads to the transmission.

A ball joint 16, which can be swivelled together with the gear shift lever 1, includes of a ball 17 fastened at the gear shift lever 1 and a ball socket 19 fastened at a joint rod 18. The joint rod 18, at its other end, carries another ball socket 20 of a stationary ball joint 21, the ball 22 of which is fastened to the underside of the transaxle tube 7.

At its upper end, the gear shift lever 1 has a handle 23. The upper opening 8 of the transaxle tube 7 is protected against the entering of dirt by means of bellows 24. The lower opening 9 is closed off by a box-shaped covering 25 which also encloses the pivotable ball joint 16 and, by means of bellows, provides a movable dust proof entrance to the gear shift rod 15 and the joint rod 18.

Radially divided rubber profiles 27 are inserted in ring-shaped indentations 26 to form a two-part guide bush 3. They elastically bridge the radial play S1 between the guide tube 4 and the guide bush 3. The rubber profiles 27 contain sealing lips 28, to which a wear-resistant sliding layer 29 of polytetrafluoroethylene (PTFE) is applied. The rubber profiles 27 also form a ring-shaped grease pocket 30 which is filled with lubricating grease and thereby disposes the guide bush 3 in a maintenance-free and easily movable manner on the guide tube 4.

In FIG. 1 and FIG. 2, the gear shift lever 1 is shown in the neutral position; i.e., the gear shift lever 1 is in a vertical position and at a right angle with respect to the transaxle tube 7. In this position, a radial play S2 exists between the guide bush 3 and the rubber profile 27. In addition, the mechanism is not in gear in the neutral position, and the gear shift lever 1 is located in the center of a preselection gap affored by the upper opening 8 of the transaxle tube 7.

For the preselecting of an operating gear, the gear shift lever 1 is swivelled transversely with respect to the driving direction; i.e., the guide bush 3 is rotated around the guide tube 4 as indicated by arrow A in FIG. 2.

As a result of the narrow space afforded by the transaxle tube 7, the pivotal movement of the ball joint 16 is slight during the swivelling of the gear shift lever 1. Because of the length of the gear shift rod 15, a sufficiently large movement of a pivotal lever at the transmission is achieved in this case. The length of the joint rod 18 is such that the ball joint 16 carries out a movement that is almost in a straight line when the gear shift lever 1 is swivelled.

If the joint rod 18 is constructed to be too short, a superposition would take place of the arc-shaped movements of the ball 17 around the guide bush 4 and of the ball socket 19 around the stationary ball 22. As a result, the gear shift lever 1, with the swivel motion, would tilt increasingly around its bearing pin 2 and would thus move the gear shift rod 15. As a result of the sufficiently long construction of the joint rod 18, this tilting movement is limited such that only the play S2 is cancelled, and the gear shift lever is in rigid contact with but is damped by the rubber profiles 27.

The limiting of the pivotal movement of the gear shift lever 1 takes place from the transmission. During the swivelling, the radial play S2 is maintained on the full circumference of the rubber profile lips 28. When the stop at the left or the right end of the preselection gap is reached, the play S2 disappears on half of the circumference of the rubber profiles 27. In this case, the play S2 is cancelled by the driver against the elastic restoring forces of the rubber profiles 27. A further swivelling of the gear shift lever 1 is possible only very slightly by compressing the rubber profiles 27.

During the preselecting, the driver therefore experiences a shifting which is easy around the neutral position and has increasing operating forces at the end of the preselection gap.

In the neutral position or at the end of the preselection gap, it is possible to shift through the gears. For this purpose, the gear shift lever 1 with the guide bush 3 is pushed onto the guide tube 4. In this case, the gear shift lever 1 supports itself at the rigid joint rod 18. The bearing pin 2 permits the rotational movement between the gear shift lever 1 and the guide bush 3. Likewise, the clip 13 rotates around the bearing pin 2, so that the clip 13, with the pin 14, in each shifting position, is in vertical position with respect to the guide bush 3 and the gear shift rod 15 is therefore shifted but not twisted. The bearing pin 2, during the shifting, first moves in parallel to the guide tube 4, whereby the ball joint 16 is moved slightly and almost in a straight line in upward direction. After a gear was shifted, the gear shift rod 15 limits a further shifting of the guide bush 3. In this case, in turn, the play S2 is cancelled on half of the circumference of the rubber profiles 27. The operating forces thereby increase at the end of the shifting paths, so that a shifting into the gear is signalled to the driver.

Despite the existence of a very narrow space, the mechanism described above permits an precise shifting of all gears. The bearing of the guide bush 3 with a sufficiently radial play on the guide pipe 4, and the elastic bridging of this play by means of the rubber profiles 27 allow rough tolerances on the guide tube 4 and in the guide bush 3. The play S2 occurring between the rubber profiles 27 and the guide bush 3 avoids jamming during the shifting of the guide bush 3 and gives the driver a positive feeling when shifting. In addition, the play S2, together with the rubber profiles 27, permits a strong damping of the vibrations affecting the gear shift lever 1 from the transmission via the gear shift rod 15. The grease in the grease pocket 30, together with the wear-resistant sliding layer 29, results in a maintenance-free easily shiftable bearing on the guide tube 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A gear shift mechanism for a motor vehicle transmission, having a manually operable gear shift lever means which is disposed in a stationary bearing means of a motor vehicle frame and to which a gear shift rod is pivotally connected which leads to the transmission, wherein the gear shift lever means is rotatably disposed at a two-part guide bush means, the guide bush means being twistably and slidably disposed at a stationary guide tube means with a first radial play which is bridged by elastic means for disconnecting vibration from the gear shift lever means, and wherein a lower end of the gear shift lever means is disposed in a ball joint means of a joint rod means, the other end of the joint rod means being disposed in a stationary ball joint means.

2. A gear shift mechanism for a motor vehicle transmission, having a manually operable gear shift level means which is disposed in a stationary bearing means of a motor vehicle frame and to which a gear shift rod is pivotally connected which leads to the transmission, wherein the gear shift lever means is rotatably disposed at a two-part guide bush means, the guide bush means being twistably and slidably disposed at a stationary guide tube means with a first radial play, wherein a lower end of the gear shift lever means is disposed in a ball joint means of a joint rod means, the other end of the joint rod means being disposed in a stationary ball joint means, and wherein the first radial play is bridged by an elastic bush means for disconnecting vibrations from the gear shift lever means.

3. A gear shift mechanism according to claim 2, wherein the elastic bush means comprises radially divided rubber profile means which are inserted into two ring-shaped indentations at ends of the guide bush means the rubber profile means forming a ring-shaped grease pocket for a constant lubrication of the guide bush means and, in an inserted state of the rubber profile means a second radial play is found between a sealing lip of the rubber profile means and the guide bush means.

4. A gear shift mechanism according to claim 3, wherein a sliding layer means is applied to an interior surfaces of the sealing lip means and rests against the guide tube means.

5. A gear shift mechanism according to claim 4, wherein the sliding layer means is a layer of polytetrafluoroethylene which is vulcanized on the rubber profile means.

6. A gear shift mechanism for a motor vehicle transmission, having a manually operable gear shift lever means which is disposed in a stationary bearing means of a motor vehicle frame and to which a gear shift rod is pivotally connected which leads to the transmission, wherein the gear shift lever means is rotatably disposed at a two-part guide bush means the guide bush means being twistably and slidably disposed at a stationary guide tube means with a first radial play, wherein a lower end of the gear shift lever means is disposed in a ball joint means, of a joint rod means the other end of the joint rod means being disposed in a stationary ball joint means, wherein the gear shift lever means is rotatably disposed in the guide bush means by a bearing pin means, and wherein a clip means is rotatably fastened to the bearing pin means at which clip means a pin means is fastened which extends substantially vertically downward and on which a gear shift rod means is rotatably disposed which leads to the transmission.

7. A gear shift mechanism according to claim 6, wherein the gear shift lever means is arranged ion a narrowly limited space permitting only slight movements in such a manner that a drive shaft means extends centrally in the guide bush means and wherein the stationary ball joint means is fastened to the underside of a transaxle tube.

8. A gear shift mechanism according to claim 7, wherein the narrowly limited spaced is the transaxle tube.

9. A gear shift mechanism according to claim 8, wherein the gear shift lever means at an upper part extending out of the transaxle tube and carrying a handle means extends in substantially a straight line and wherein, inside the transaxle tube, the gear shift lever means extends in the U-shape around the guide bush means and the pin means and wherein a bearing pin means is fastened to the gear shift lever which disposes the gear shift lever means rotatably at the guide bush means.

10. A gear shift mechanism according to claim 9, whenever the gear shift lever means in its upper, straight-extending part, has a longitudinal central axis which, at each shifting position of the gear shift lever means, intersects a center axis of the drive means shaft and a center point of a ball of the ball joint.

11. A gear shift mechanism according to claim 10, wherein the joint rod means carries ball sockets at both ends which each accommodate a ball of one of the ball joint means and the stationary ball joint means, and wherein the joint rod means has such a length that the ball joint means during slight swivel movements of the gear shift lever, is moved almost in a straight line.

* * * * *